United States Patent [19]

Arway et al.

[11] Patent Number: 4,555,712

[45] Date of Patent: Nov. 26, 1985

[54] INK DROP VELOCITY CONTROL SYSTEM

[75] Inventors: George Arway, Norridge; Frank Eremity, Hanover Park; George Dick, Chicago, all of Ill.; Elaine Pullen, Brentwood, England

[73] Assignee: Videojet Systems International, Inc., Elk Grove Village, Ill.

[21] Appl. No.: 637,404

[22] Filed: Aug. 3, 1984

[51] Int. Cl.[4] .............................................. G01D 15/18

[52] U.S. Cl. ................................. 346/75; 346/140 R; 73/861

[58] Field of Search ................. 346/140 IJ, 75, 140 R; 73/291, 861

[56] References Cited

U.S. PATENT DOCUMENTS 3,930,258 12/1975 Dick et al. ............................ 346/75

4,067,020 1/1978 Arway .................................. 346/75

4,121,222 10/1978 Diebold et al. ....................... 346/75

4,337,468 6/1982 Mizuno ...................... 346/140 R X 4,382,382 5/1983 Wang ................................ 73/291 X

FOREIGN PATENT DOCUMENTS 55-109667 8/1980 Japan ..................................... 346/75

*Primary Examiner*—E. A. Goldberg

*Assistant Examiner*—Frederick L. Kampe

*Attorney, Agent, or Firm*—McDougall, Hersh & Scott

[57] ABSTRACT

A method and apparatus are disclosed for providing feedback control of the ink drop velocity in a drop marking system. The control system maintains essentially constant velocity of the ink drops as they pass through a deflection field which causes certain of the electrically conductive drops to be directed onto a substrate to be marked. The ink flow between two selected points is monitored by a control device to generate ink flow rate data and compared against a reference value. In the event that a flow rate deviation is sensed, appropriate action is taken to change the flow rate. Such action includes altering ink viscosity and/or ink pressure.

16 Claims, 8 Drawing Figures

INK DROP VELOCITY CONTROL SYSTEM

BACKGROUND OF THE INVENTION

This invention relates to the field of drop marking systems of the type in which a liquid ink is forced under pressure through a nozzle which converts the liquid into droplets which can then be controlled by various means while projected toward a substrate for marking purposes. Examples of such systems include the familiar ink jet marking systems used for high speed label printing, product identification and the like, although there are other drop marking systems known in the art. One particular type of system which advantageously employs the present invention is the continuous stream, synchronous ink jet printer. Such a system typically includes an ink reservoir and a remotely located nozzle connected to the reservoir by a conduit. Ink is forced under pressure from the reservoir to the nozzle which emits a continuous stream of ink drops. The ink, which is electrically conductive, is provided with a charge as the drops leave the nozzle. The drops then pass through a deflection field which causes selected drops to be deflected so that some of the drops are deposited onto a substrate while the remaining drops are returned to the reservoir by a suitable ink return means.

In order to produce high quality marking, it is important that the ink drops pass through the deflection field at a relatively constant velocity. Thus, ink drops with similar charges but different velocities will experience unequal amounts of deflection resulting in inconsistent print quality.

The condition of constant ink drop velocity through the deflection field requires that the flow rate of liquid through the nozzle be substantially constant. Prior ink marking systems have attempted to accommodate this requirement by various means. None, however, has been entirely successful measured in terms of simplicity, cost, reliability and overall accuracy of the resulting function.

One class of prior art devices attempt to obtain constant velocity by using constant ink delivery pressure in conjunction with a system of indirect viscosity control. These devices, manufactured by the assignee of the present invention and disclosed in U.S. Pat. Nos. 3,930,258 and 4,121,222, employ constant volume ink reservoirs. The amount of ink solvent evaporative loss is measured either by weighing the reservoir or by measuring the volume change. Ink loss due to marking is replenished by using a plurality of make up ink formulations or by using a drop counter. The accuracy of the latter approach is limited by the fact that the volume of ink lost is calculated, not measured and thus the volume of replacement ink required is only an approximation of the correct amount.

Another prior art system, disclosed in U.S. Pat. No. 4,337,468, counts printed drops as well as measuring the amount of ink returned to the system. This information is used to calculate the amount of evaporative loss and additional solvent is added in response thereto. This technique is open loop (no feedback control) and does not permit the degree of accuracy desired to insure essentially constant velocity through the deflection field of the ink jet device.

Other efforts to deal with these problems are known in the prior art. One such system employs a specific gravity detector which signals when it is necessary to add solvent to the ink supply. This system overcomes the drawbacks of drop counting but is unsuitable for use in systems where the printer must accommodate many different types of inks, each with its own specific gravity parameters. Further, in general, these devices do not provide good determinations as to the viscosity of the ink and as a result, additional viscosity control is required as by use of a heating device in the ink supply system, such heating system being referenced against ambient temperature rather than any flow property of the ink.

Another commercial system which tries to deal with the problem of changing ink viscosity is manufactured by the IBM Corporation. In this device the ink pressure is resposive to signals from a deflection detector. The deflection detector is located in the electric field through which the drops pass. The detector signals the pump to increase or decrease pressure, as necessary, to maintain drop velocity at an appropriate value. This system provides feedback control of drop velocity. The technique, however, is not entirely satisfactory because of the complexity and cost of the components and the need for a fragile deflection detector at the remote print head location.

Other available ink jet systems employ viscometer for adjusting the viscosity of the ink. Such systems are unduly complex and expensive and the results of such techniques still do not provide direct feedback control with respect to the drop velocity through the charge field. Control is indirect based on the viscosity of the ink.

The present invention, by sensing the flow of the ink from the reservoir and generating ink flow rate data, monitors the velocity of the drops of ink in the charge field and adjusts the ink parameters to maintain a desired flow rate which insures a substantially constant drop velocity. In effect, the present invention provides direct control over the velocity of the ink drops and does so by use of low cost components arranged in a simple manner.

It is an object of the present invention to incorporate direct feedback control into an ink drop velocity control system which is simple, reliable and low in cost.

Another object of the invention is to provide a velocity control system for an ink jet printer which maintains the velocity of ink through a deflection field substantially constant thereby insuring accurate location of drops on the substrate to be marked.

A further object of the invention is to provide an electronic control system for an ink jet printer to permit accurate control of the addition of solvent to the system.

Another object of the invention is to provide a flow control means for an ink jet system which is located entirely separate from the print head nozzle and yet maintains a substantially constant flow rate through the nozzle.

Other objects and advantages of the invention will be apparent from the remaining portion of the description.

SUMMARY OF THE INVENTION

The present invention provides direct feedback control of ink drop velocity. The invention eliminates the need for drop counters and evaporated loss measurement schemes of the prior art.

The present invention measures the length of time required for a given volume of ink to flow through the ink jet nozzle. This information is supplied to a suitable electronic controller (for example, a microprocessor) to control one or more subsystems which cause a change in the ink flow rate as, for example, by changing the system pressure or the ink viscosity. In a typical application the ink flow rate and drop velocity is initially set, by adjustment of the pressure in the ink flow line, to a condition which yields proper drop spacing. The present invention then forces perpetuation of a constant flow rate through the nozzle orifice resulting in a stream of ink drops of essentially unchanging velocity whereby accurate deflection of the ink drops for accurate deposition of certain drops onto the substrate can be achieved. The ink flow information, which is obtained at a location remote from the nozzle orifice, represents the velocity of the drops projected from the nozzle so that such velocity can be accurately maintained.

DETAILED DESCRIPTION

Figure 1:
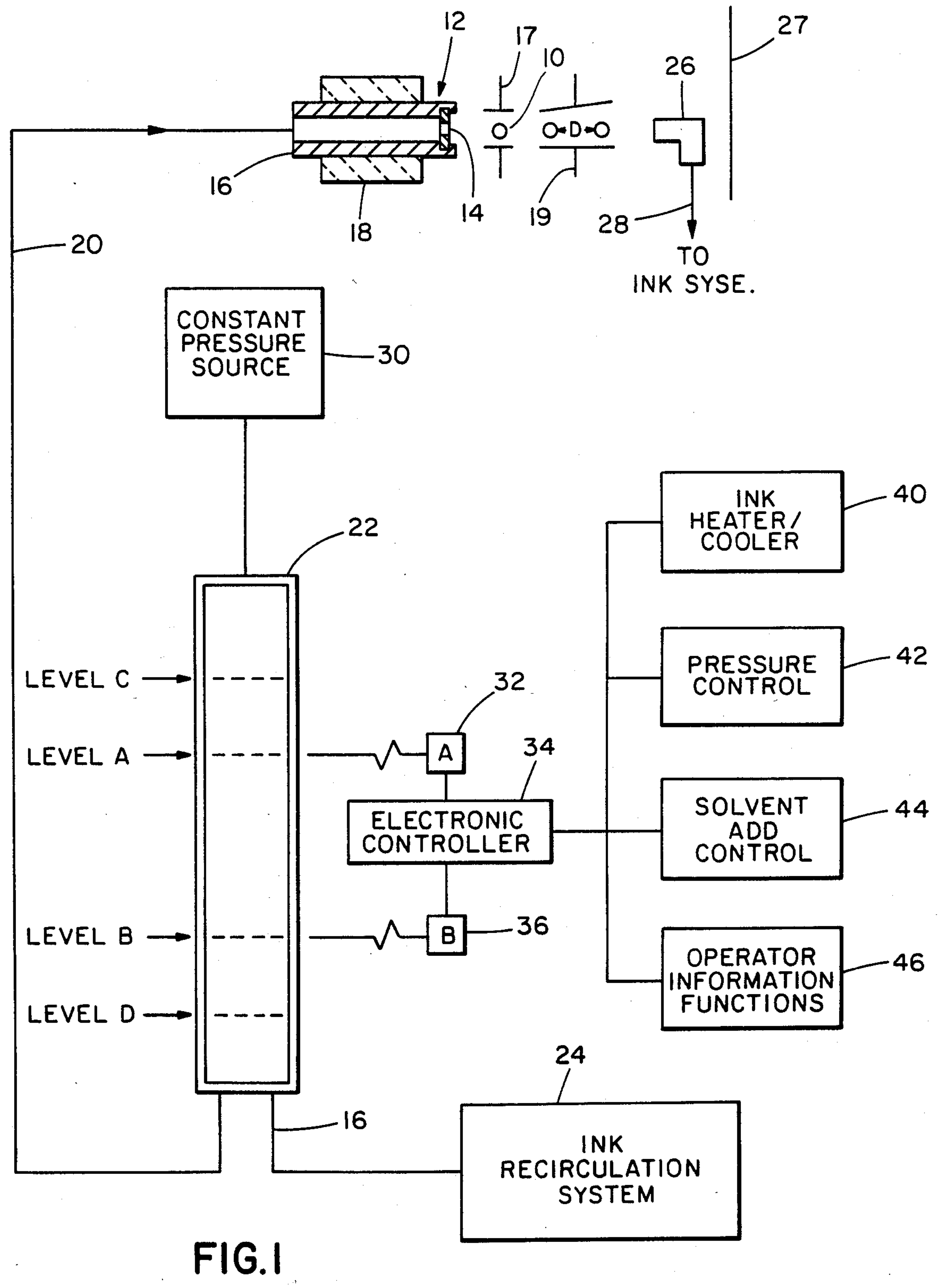
FIG. 1 is a schematic drawing of an ink jet system incorporating the elements of the present invention.

Referring to FIG. 1, a generalized schematic of the invention, applied to a typical ink drop marking system, is shown. In a typical marking system a plurality of ink drops 10, separated by a spacing D, emanate from an ink jet nozzle 12 having an orifice 14. The nozzle is acted upon by a piezo electric device 18 in a manner well known in the art (see, for example, U.S. Pat. No. 3,512,172). The drops pass adjacent a charging electrode 17 and then through an electrical deflection field schematically represented by plates 19. Ink flows to the nozzle 12 by way of a flexible conduit 20 from a pressurized supply tank 22 which is usually remotely located from the print head. Of course, it will be recognized that a supply tank may supply ink to several ink jet nozzles.

The supply tank 22 is repetitively filled by suitable means which comprise a part of the ink recirculation system designated generally at 24. Such recirculating systems may have many forms as is known in the art. Typically, a recirculation system will include an ink drop return mechanism such as the collector 26 positioned to receive ink drops which are not projected onto a substrate 27 and a conduit 28 to return the unused ink to the recirculation system 24 and then to the reservoir 22. Typical ink recirculation systems also include means for adding additional ink and solvent in order to make up for depletion during operation.

A suitable substantially constant pressure source, for example, gas pressure is supplied to the tank or reservoir 22 to cause ink flow from the reservoir to the nozzle. In the preferred embodiment a compressed gas (air) pressure source 30 is provided which is a regulated source as disclosed, for example, in U.S. Pat. No. 4,067,020.

In operation the supply tank or reservoir chamber 22 is filled with an electrically conductive ink to some arbitrarily determined level as indicated at C for example. As ink flows out of the tank to the nozzle the level of ink in the tank decreases until it reaches a second, arbitrarily determined level as indicated at A. When the liquid level reaches A, a first level detector 32 is activated signalling an electronic controller 34 which initiates a time interval.

Ink continues to flow out of the nozzle causing a drop in the tank level until at some later time the level of the ink in the supply tank reaches a third, arbitrarily determined level as indicated at B. A second liquid level detector 36 is activated signalling the controller 34 to cease measurement of the time interval.

When the controller receives this second signal, it compares the time interval or the average of a succession of such intervals to an established reference interval. If necessary the controller then initiates suitable action, as will be described, to force the ink flow rate through the nozzle to change such that successive time intervals will approach the reference interval.

The level of ink in the tank 22 after passing point B may continue to fall until some suitable level as indicated at D is reached. At this point the ink recirculation system 24 refills the supply tank. Of course, the foregoing is a generalized indication of the location of the various points A through D. Other locations can be selected as desired and, for example, point D will usually be the same as point B so that upon completing measurement of the time interval between points A and B, the recirculation system will refill the tank to level C in preparation for the next time interval measurement.

As indicated, the liquid level detectors 32 and 36 provide their input to an electronic controller 34. The detector may be of any commercially available type as, for example, a magnetic float which actuates a common reed switch whereby a change in state of the reed switch (open to close or vice versa) is detected by the controller 34.

The controller may be a solid state logic system or a programmed computer as, for example, a microprocessor computer system. Responsive to the switches 32 and 34, the controller will activate one or more output devices under its control as indicated schematically in FIG. 1. These devices include ink heating and/or cooling means 40, pressure control means 42 and solvent control means 44. In addition, the controller may operate an information display, such as a LED or LCD display, to provide information to an operator concerning the status of the system as indicated at 46.

The specific means 40 through 44 are discussed in detail in connection with the embodiments of FIGS. 2 through 6. However, it can be seen that the invention is directly responsive to the flow rate data derived from the flow of ink between points A and B. The electronic controller adjusts system operation to insure that the flow rate of ink through the nozzle orifice 14 is such as to insure constant velocity of the ink drops through the electrically charged field. This results in a much more accurate placement of the ink drops on a substrate.

The specific operation of the electronic controller is discussed in connection with FIGS. 7A and 7B. A summary of its operation, however, is presented here. The controller has a reference time for the flow of an established quantity of ink, that is the quantity of ink extant between the points A and B, set either by being programmed in or manually entered by the system operator or computed by the electronic controller. First, to initialize the system, either automatically or by operator control, the velocity of the drops is set. For example, pressure is adjusted until the desired drop velocity is obtained in the operating system. As the system operates, the controller stores and averages a number of measurements of time required for the ink to pass between levels A and B. Typically, ten measurements may be used. When the required number of measurements have been taken the reference time is compared against the average time of the actual measurements. Alternatively, the reference may be multiplied by the number of actual measurements and the comparison performed. If the actual measurements are greater than the reference, it is necessary to increase flow through the nozzle orifice. This can be effected by a number of possible actions contemplated by the present invention: (1) solvent may be added to the ink to lower its viscosity; (2) the pressure driving the ink to the nozzle may be increased; or (3) the ink temperature may be increased by heating thereby lowering ink velocity.

On the other hand, if the computed total is less than the reference value, it is necessary to decrease the flow rate through the nozzle orifice and opposite actions are required. For example, simply not adding solvent to the ink will increase its viscosity due to the normal evaporative losses as the ink circulates through the marking system. Alternatively, the ink pressure can be decreased or a cooler can be used to cool the ink or a heating system turned off.

The controller repeats the above actions to maintain a substantially constant measured time interval which corresponds to a substantially constant ink flow rate and that, in turn, corresponds to a substantially constant ink drop velocity. The rate at which the measurement cycles occur is a function of the size of the supply tank, typically on the order of 10 ml, the precision required and a number of related factors including whether or not the system is utilized for one ink jet nozzle or multiple nozzles. For example, with a single ink jet head it may be sufficient to check flow rate at approximately one minute intervals but shorter or longer intervals may also be employed.

Figure 2:
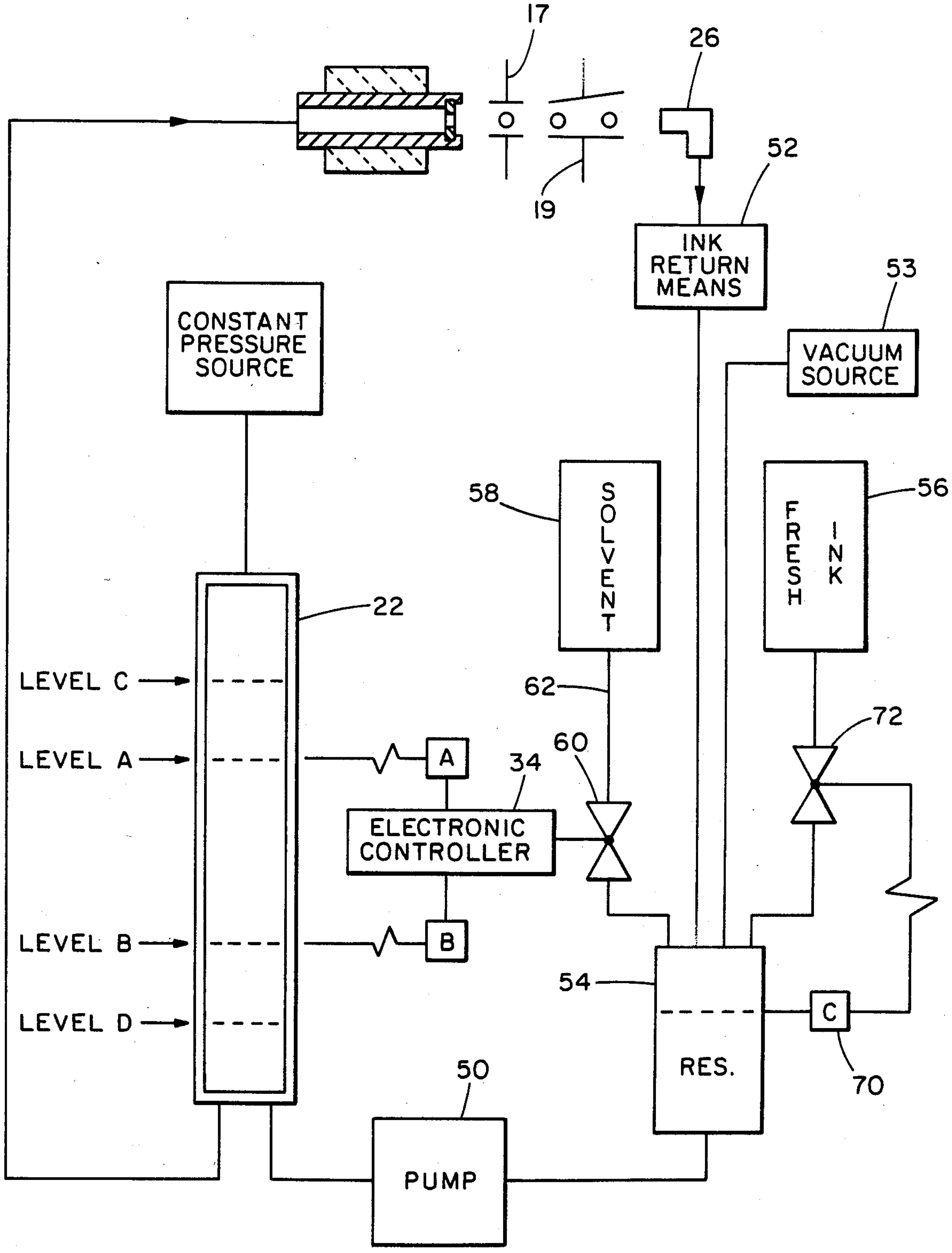
FIG. 2 is a drawing similar to FIG. 1 disclosing a preferred embodiment of the invention.

Referring to FIG. 2, a preferred embodiment of the invention is disclosed. In this embodiment the ink recirculation system includes a pump 50 supplying ink to the tank 22 from the catcher 26, the associated ink return means 52 and a reservoir 54 which receives fresh ink from a tank 56 and solvent from a tank 58. Whenever the electronic controller 34 commands refilling of the tank 22, pump 50 accomplishes this by drawing fluid from the reservoir 54 into the tank 22. The contents of the reservoir will be mixture of fresh ink, return ink and solvent in proportions determined, in part, by the electronic controller as will be described.

When the electronic controller determines that the flow rate of ink through the tank is below the set point value, it adds solvent to the system. This is accomplished by permitting the controller to operate a valve 60 in the line 62 between the solvent tank 58 and the reservoir 54. Programmed into the controller is the flow rate of the solvent through the conduit 62 whereby the controller can determine the amount of solvent to be added and thereafter shut off the valve 60. Alternatively, the controller can be programmed to operate the valve for a fixed length of time thereby to add a known amount of solvent each time that it detects solvent is required and to continue adding solvent on subsequent operating cycles until solvent is no longer required.

As indicated previously, the reservoir 54 contains fresh ink from the tank 56, return ink from the ink catcher 26 via return means 52 and the associated vacuum source 53, and solvent from the tank 58. The entry of fresh ink into the reservoir 54 can be controlled by a suitable detector 70 which opens a valve 72 whenever the liquid in the reservoir 54 drops below a specified level.

Thus, the FIG. 2 embodiment measures the time interval for the ink to flow between the levels A and B in the tank 22 and makes a comparison of the data representing the flow rate against a standard value. If the flow rate is too great, it does not add make up solvent from container 58. Accordingly, as solvent evaporates viscosity increases and flow rate decreases toward the reference value. If the flow rate is insufficient, the electronic controller operates valve 60 adding solvent to the reservoir 54 thereby lowering the viscosity of the ink sent to tank 22 so that subsequent operation of the print head will result in an increased flow rate thereby to maintain the directed drop velocity.

Figure 3:
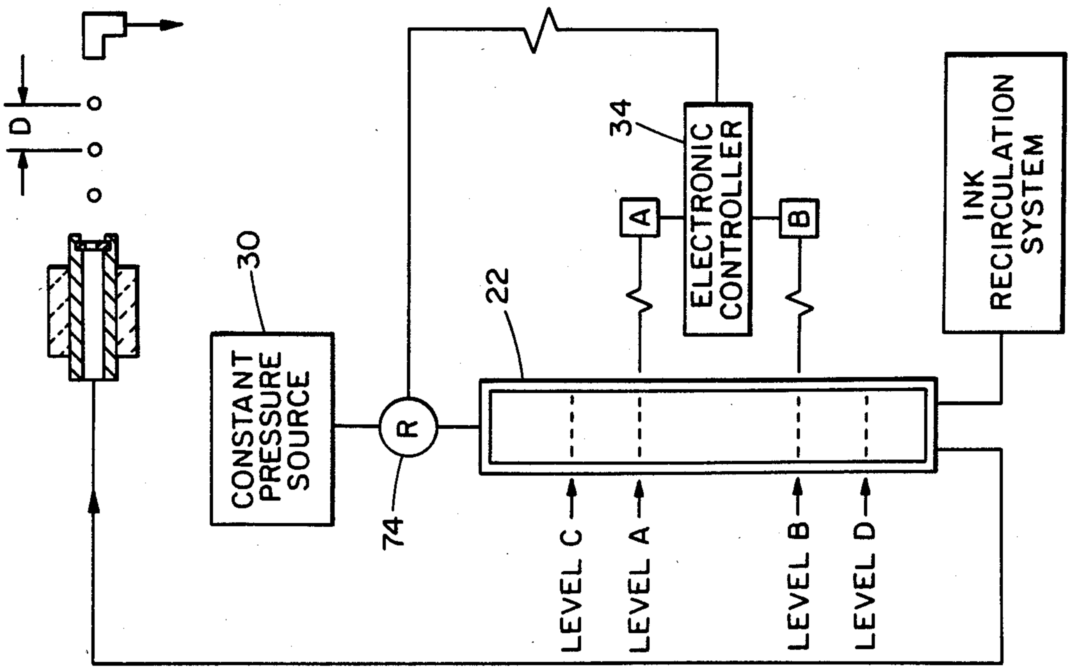
FIG. 3 is a drawing similar to FIG. 1 disclosing a first alternate embodiment.

Referring to FIG. 3, a first alternative embodiment is disclosed. In this figure only the elements which are different from the previous embodiment are shown in detail. The FIG. 3 embodiment utilizes a different principle for controlling the flow rate of the drops from the nozzle. In this embodiment the electronic controller operates a pressure regulator 74 which controls the gas pressure from source 30. By increasing the pressure on the ink in the tank 22 an increased flow rate can be obtained when necessary and, of course, by decreasing the regulator pressure a decreased flow rate can be obtained.

Figure 4:
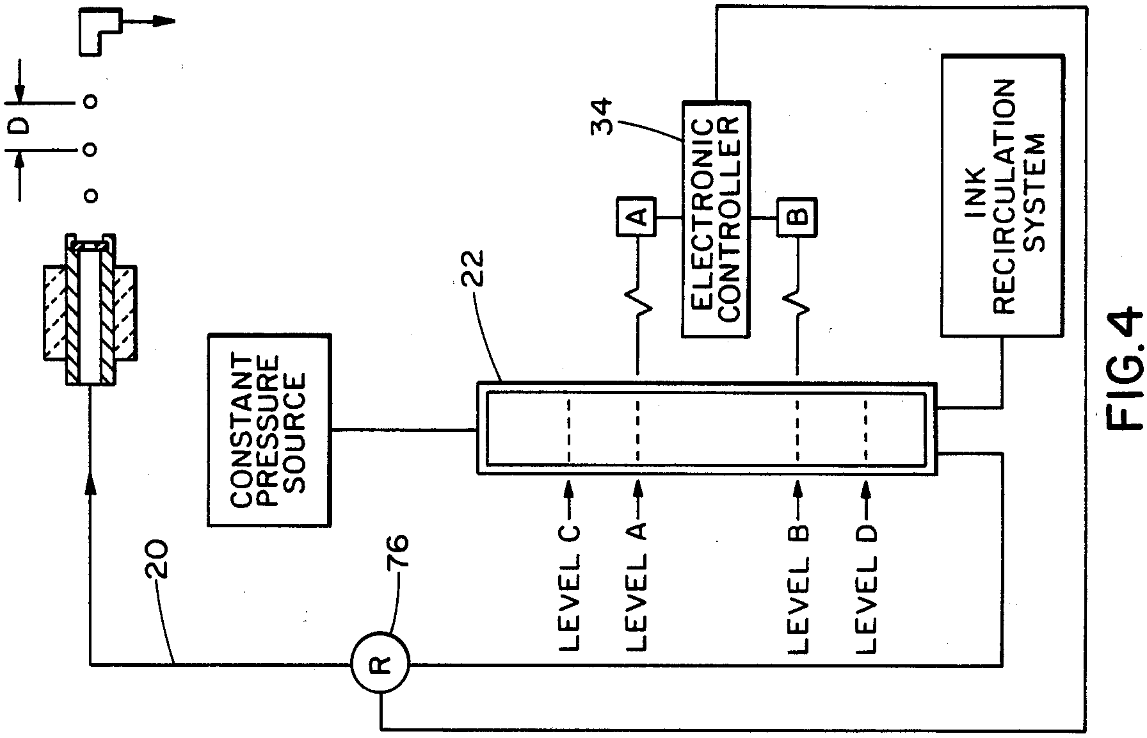
FIG. 4 discloses a second alternate embodiment of the invention.

Referring to FIG. 4, a second alternate embodiment is disclosed. In this embodiment the electronic controller operates a liquid pressure regulator 76 which acts on the ink flowing through the conduit 20. The ink in the supply tank 22 is pressurized by the usual gas source 30 to a pressure higher than is required to feed ink to the nozzle. The final ink delivery pressure to the orifice is, in turn, controlled by the regulator 76 which is instead responsive to the electronic controller.

Figure 5:
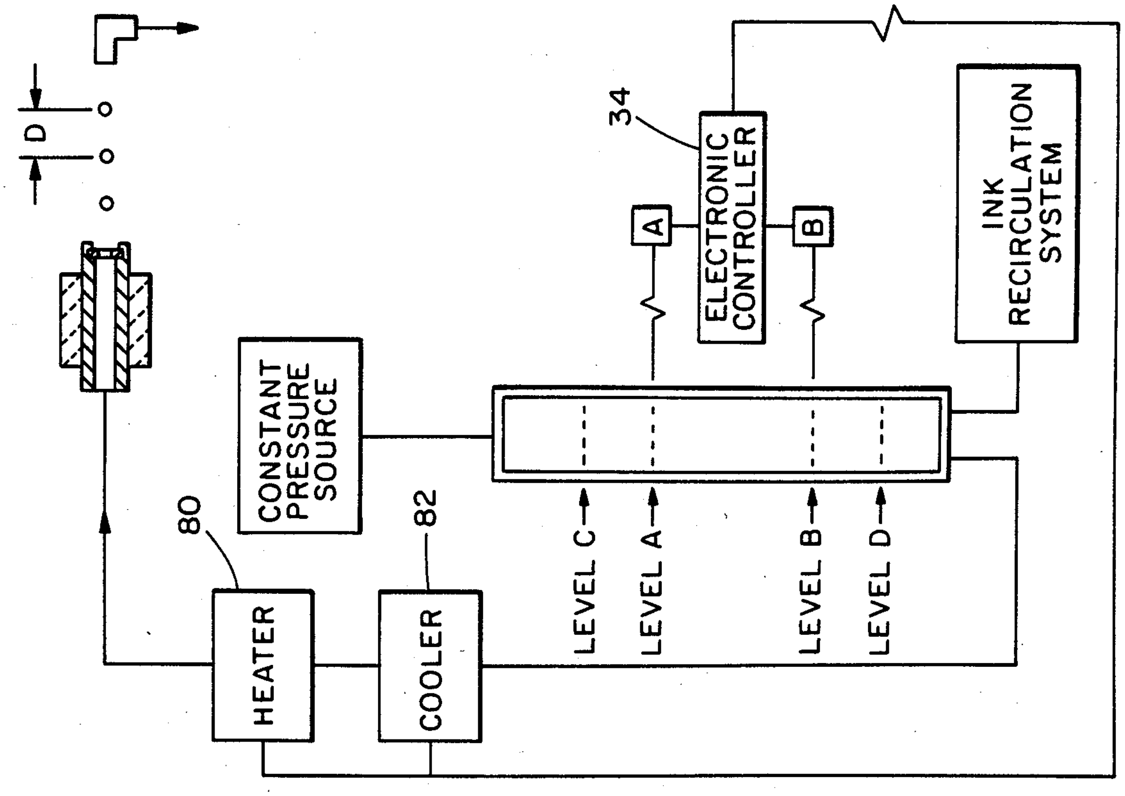
FIG. 5 discloses a third alternative embodiment of the invention.

Referring to FIG. 5, a third alternate embodiment of the invention is disclosed. In this embodiment temperature-viscosity relationship of the ink is employed. Ink viscosity decreases with increasing temperature and vice versa. Accordingly, the electronic conroller operates heating and/or cooling elements indicated at 80 and 82, respectively, disposed in the supply line from the tank to the nozzle. It will be apparent that only one of these units need be employed whereby viscosity can be decreased by turning on the heater and increased by turning it off or, conversely, viscosity can be increased by cooling the ink and increased by turning off the cooling unit.

The use of both a heater and cooler would be an unusual application requiring extremely precise control. Both units are shown in the drawing merely for the purpose of explaining the technique of control according to the invention.

Figure 6:
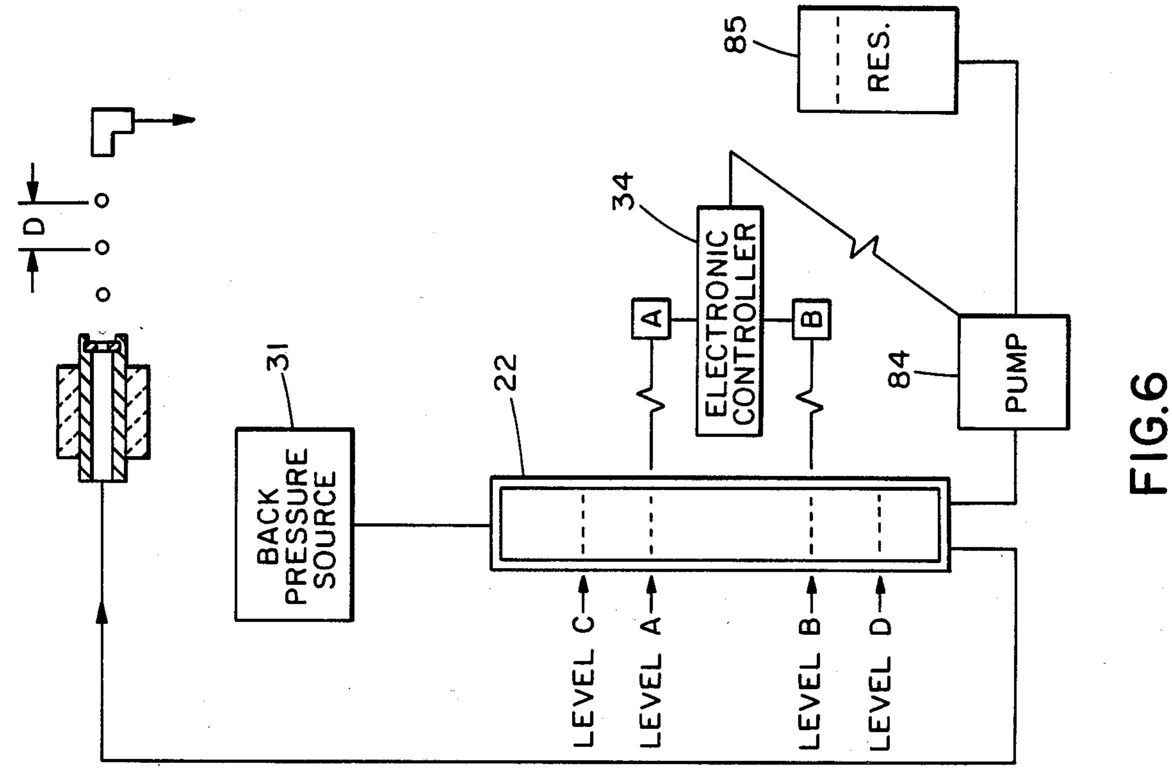
FIG. 6 discloses a fourth alternative embodiment.

A final embodiment of the invention is disclosed in FIG. 6. In this embodiment the output of a pump 84 is changed responsive to the electronic controller. Pump 84, at the end of each measurement period, supplies fresh ink from a reservoir 85 to refill the tank 22. The output of the pump 84 is increased when an increase in ink pressure is needed. Conversely, the output of the pump is decreased when the controller requires a reduction in ink pressure. In this embodiment the gas pressure source 31 differs from the sources 30 used in the previous embodiments. Source 31 is a back pressure device which does not maintain a constant pressure in the tank. Thus, if the pump 84 inceases its output, the ink pressure will be higher and vice versa. Thus, the action of the pump 84 in supplying make up ink to the tank alters the ink pressure to the nozzle.

Figure 7A:
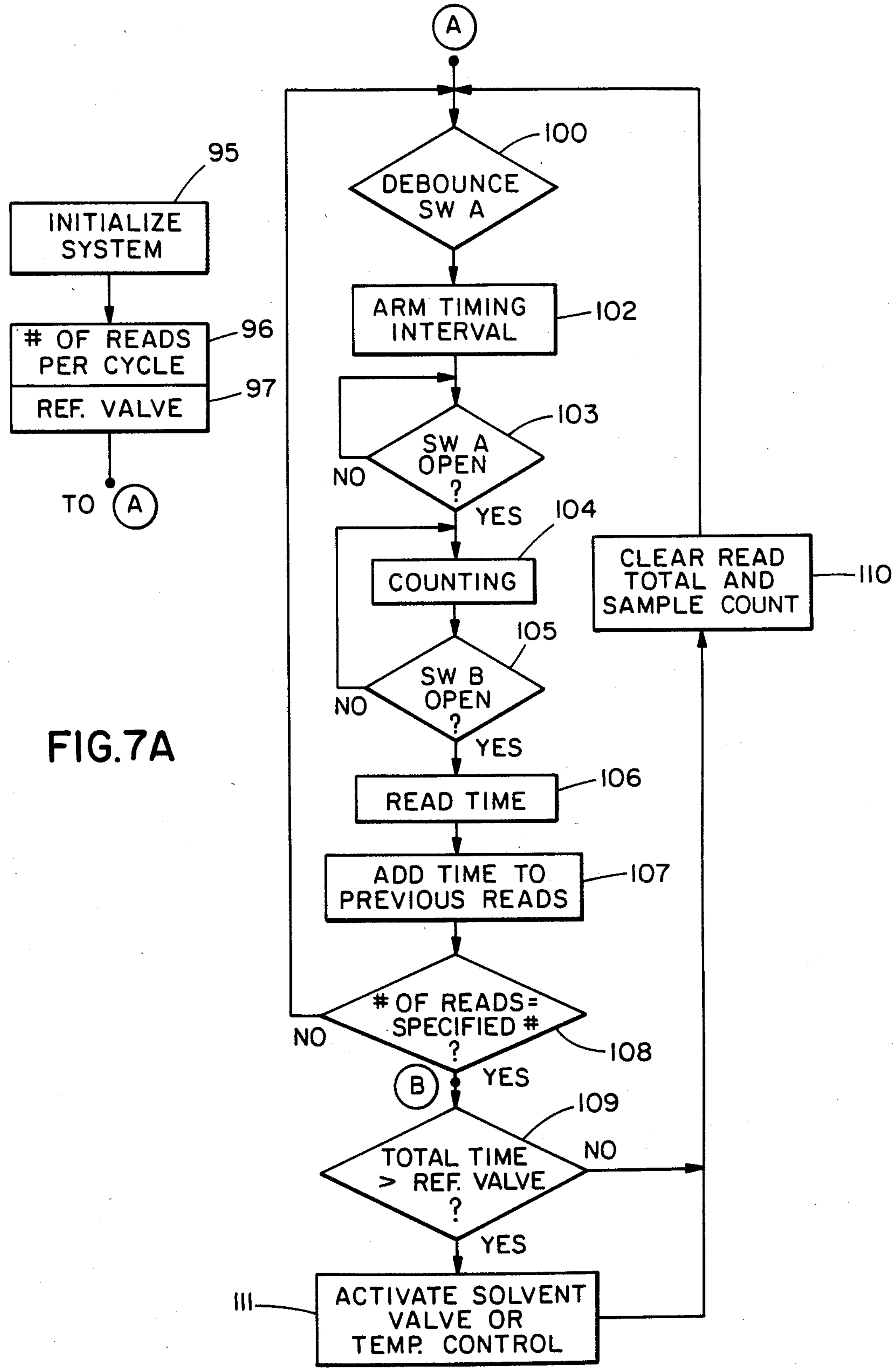
FIGS. 7A and 7B disclose flow diagrams suitable for use in programming a microprocessor as the controller.
Figure 7B:
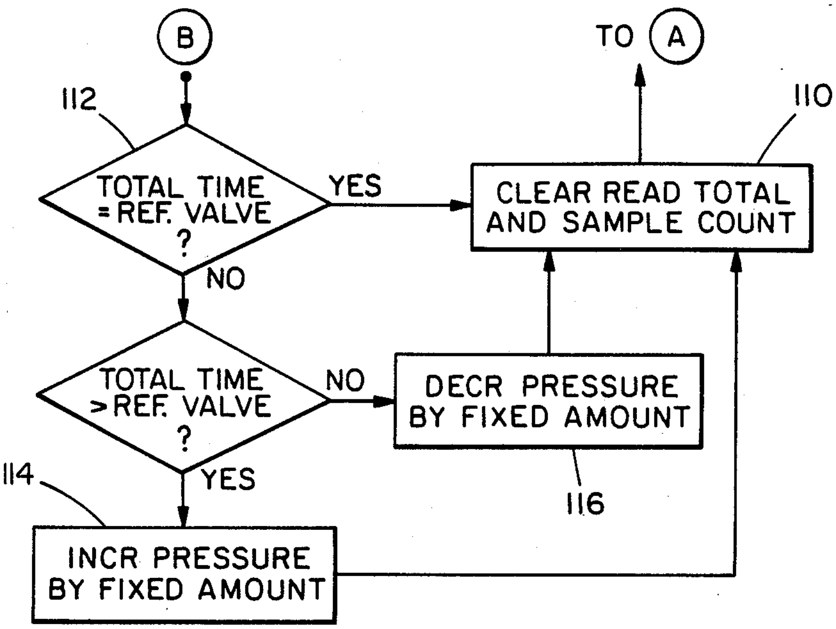

Referring to FIGS. 7A and 7B, flow diagrams are disclosed. As indicated previously, it is possible to implement the electronic controller according to the present invention in a number of ways including random logic, commercially available controllers modified for the purpose or, preferably, by use of a programmed microcomputer or similar device. It is preferred to use a microcomputer because a dedicated logic unit would not be flexible enough to accommodate the wide variety of applications for which an ink drop marking system is suited. By utilizing a programmable computer as the controller, changes in the system operation can be easily accommodated.

As recognized by those in the art, there are many different computer systems available which are suitable for this application. Each such system has its own set of programming instructions and operating methods. Accordingly, it is not useful to provide a program listing of the instructions which such a controller would utilize as different instructions would be required for every system. In FIGS. 7a and 7B, however, there are provided flow diagrams of the functions which need to be carried out to make the invention operate as described herein. Anyone skilled in the computer programming art can utilize the flow diagrams to prepare an appropriate program for a particular microcomputer system whereby the present invention can be carried out.

Referring now to FIG. 7A, a flow diagram describing a manner of programming the computer embodiment of the electronic controller is disclosed. Prior to operation of the system it is necessary to initialize it which includes providing the number of reads per cycle of operation as well as the reference value. After initialization at 95–97 the main operating routine is entered. This is indicated at point A in FIG. 7A. The first activity is to make sure that the switch and float associated with point A in the ink tank is in the correct position to begin sensing ink flow. For that purpose a debounce routine is provided as indicated at 100. Thus, the system will not initiate operation, by arming the switch A, until it has verified that the tank has been refilled, the switch is in the correct position and has stopped oscillating or "bouncing".

At that point in time switch A is armed and enabled to signal the controller when the ink level drops below point A, as indicated at 102. The computer then enters a loop indicated at 103 in which it repetitively monitors switch A until it detects that the switch has opened at which time the counting interval begins as indicated at 104. The program next enters a second loop monitoring the state of switch B until it too is detected as open as indicated at 105. When switch B opens it is detected and the counting interval terminates and the time of the interval is read by the program at 106 and stored in an appropriate memory location. The time for this interval, according to a preferred embodiment of the invention, is then added to the time for the previous reads in a particular cycle as indicated at 107. As previously indicated, however, it is possible, instead of accumulating a total of previous reads, to average them in which case a different reference value would be utilized.

The progam next checks to see if the number of reads or times that a counting interval has been completed equals the number specified during system initialization. If not, the program branches back to the beginning and conducts further counting intervals.

When the number of reads does equal the number specified during initialization, the program branches to 109 where a comparison is made of the total time for all intervals against the reference value. Box 109 represents the type of program which would be utilized for the preferred embodiment of FIG. 2 as well as for the embodiment of FIG. 5 in which the viscosity of the ink is altered responsive to the need for adjustment in the flow rate. FIG. 7B discloses the appropriate portion of the flow diagram for the remaining embodiments as will be discussed presently.

In the case of FIG. 7A, if the total time measured is less than or equal to the reference value, this means that the flow rate is equal to or greater than the desired value. Accordingly, it is not desired to thin the ink or heat it, either of which would reduce its viscosity and increase flow rate. Accordingly, in that case the program branches back to the beginning via a subroutine indicated at 110 which clears the read total and the sample count to begin a new cycle. Alternatively, if the total time exceeds the reference value, then the flow rate is less than the rate desired and, accordingly, the program permits the controller to initiate corrective action.

In the case of the FIG. 2 embodiment, the solvent valve 60 is actuated adding solvent to the reservoir 54 which, in turn, is supplied to the tank 22 resulting in a reduced viscosity for the ink and an increased flow rate. Similarly, in the case of the FIG. 5 embodiment, the ink heater would be activated to warm the ink sufficiently to reduce its viscosity, achieving the same result. Likewise, if an ink cooler were used the program would be reversed so that if the ink were flowing too quickly, cooling would be turned on whereas if it were flowing too slowly, cooling would be turned off. After the solvent or temperature control activity indicated at 111 occurs, the program branches back to the beginning via subroutine 110.

Referring to FIG. 7B, the modification to the flow diagram required for the embodiments of FIGS. 3, 4 and 6 is disclosed. FIG. 7B replaces the portion of the FIG. 7A flow diagram from point B on. As with the FIG. 7A flow diagram, when the specified number of reads has occurred, the program makes a comparison. In the case of FIG. 7B the first comparison, as indicated at 112, is whether the total time is equal to the reference value. If so, no pressure adjustment is required and accordingly the program branches, via subroutine 110 back to the beginning. If, however, the total time does not equal the reference value, it is necessary to determine if the total time is greater than or less than the reference value. If greater, as indicated at 114, pressure is increased by a fixed amount and the program branches back to the beginning. If the total time is less than the reference value, it is necessary to decrease the pressure, as indicated at 116, and then the program branches back.

It will be apparent, depending upon which embodiment, FIGS. 3, 4 or 6, is utilized increasing or decreasing the pressure will take the form of adjusting a regulator valve for the air source 30 (FIG. 3), adjusting a regulator valve in the ink conduit (FIG. 4) or adjusting the rate of the pump 84 (FIG. 6). All of these functions, however, can be accomplished by the electronic controller via appropriate solenoids, relays, solid state switches, etc., well known to those skilled in the art.

While we have shown and described embodiments of the invention, it will be understood that this description and illustrations are offered merely by way of example, and that the invention is to be limited in scope only as to the appended claims.

What is claimed is:

1. An ink drop velocity controller for a drop marking system having an ink supply reservoir, a nozzle having at least one orifice to form at least one stream of ink drops and a pressure source to force the ink from the reservoir through the nozzle orifice, said controller comprising:

(a) means for detecting the flow of ink from the reservoir through said nozzle orifice, (b) means for altering the ink flow rate to the nozzle, (c) controller means responsive to the detecting means for comparing the ink flow against a reference value to identify deviations from said reference value and for controlling said altering means responsive to said comparison, (d) said detecting means includes at least two signalling means operatively positioned in said reservoir, each for signalling the controller means when the ink reaches a predetermined level in the reservoir, said controller means generating flow rate data representing the actual ink flow rate based on the elapsed time between operation of each signalling means, whereby the velocity of the ink drops produced by the nozzle can be maintained substantially constant thereby permitting accurate placement of the drops on a surface to be marked.

2. An ink drop velocity controller in accordance with claim 1 wherein each signalling means includes:

(a) a float disposed in the reservoir, (b) an electrical switch coupled to the float operative to signal the controller means when the float is displaced by the changing ink level.

3. An ink drop velocity controller for a drop marking system having an ink supply reservoir, a nozzle to form a stream of ink drops and a pressure source to force the ink to the nozzle from the reservoir, said controller comprising:

(a) means for measuring the time interval required for an established volume of ink to flow to said nozzle, (b) controller means responsive to said measuring means for comparing said time interval against a reference value to identify deviations from the latter, (c) means responsive to the controller means for altering the ink flow rate to maintain said time interval substantially equal to said reference value.

4. An ink drop velocity controller in accordance with claim 3 wherein the altering means includes means for regulating the pressure employed to force the ink to the nozzle whereby if the flow rate is too high the pressure is lowered and vice versa.

5. An ink drop velocity controller in accordance with claim 4 wherein the regulating means is a pressure regulator associated with said pressure source and operated by said controller means.

6. An ink drop velocity controller in accordance with claim 4 wherein the ink is supplied from the reservoir to the nozzle via a conduit, said regulating means includes a regulator in the conduit to control the ink flow rate to the nozzle.

7. An ink drop velocity controller in accordance with claim 4 wherein the regulating means comprises a variable output pump supplying ink to said reservoir, the pump output being directly proportional to the pressure employed to transport the ink to the nozzle.

8. An ink drop velocity controller in accordance with claim 3 wherein the altering means includes means for changing the viscosity of the ink.

9. An ink drop velocity controller in accordance with claim 8 wherein the viscosity changing means includes means for changing the temperature of the ink supplied to the nozzle.

10. An ink drop velocity controller in accordance with claim 8 wherein the viscosity changing means includes means for adding solvent to said ink, whereby increasing the solvent content lowers the viscosity increasing the flow rate and vice versa.

11. An ink drop velocity controller in accordance with claim 10 wherein the solvent adding means includes:

(a) a solvent supply, (b) means for communicating the solvent supply to the ink supply reservoir responsive to said controller means.

12. An ink drop velocity controller in accordance with claim 11 wherein the communicating means includes:

(a) means for pumping solvent into said ink supply reservoir, (b) valve means for controlling solvent flow from the solvent supply to the pumping means responsive to said controller means.

13. An ink drop velocity controller in accordance with claim 3 wherein said controller means includes:

(a) means for determining ink flow rate data, (b) means for comparing said flow rate data against said reference value, (c) means for signalling said altering means to cause a change in the flow rate when variations from said reference value are identified.

14. An ink drop velocity controller in accordance with claim 3 wherein said controller means is a programmed computer.

15. An ink drop velocity controller in accordance with claim 13 wherein said controller means is a programmed computer and said determining means, comparing means and signalling means is the computer system hardware operated under program control.

16. A method for controlling ink drop velocity in a drop marking system having an ink supply, a nozzle to form a stream of ink drops and a pressure source to force the ink to the nozzle from the supply, said method comprising the steps of:

(a) measuring the time interval required for a known volume of ink to flow to said nozzle, (b) comparing the time interval against a reference value to identify deviations therefrom, (c) altering the ink flow rate to maintain said time interval substantially equal to said reference value.

* * * * *